Feb. 17, 1953 — L. C. HESTER — 2,628,547
TRACTOR MOUNTED DISK PLOW
Filed Nov. 22, 1949 — 3 Sheets-Sheet 1
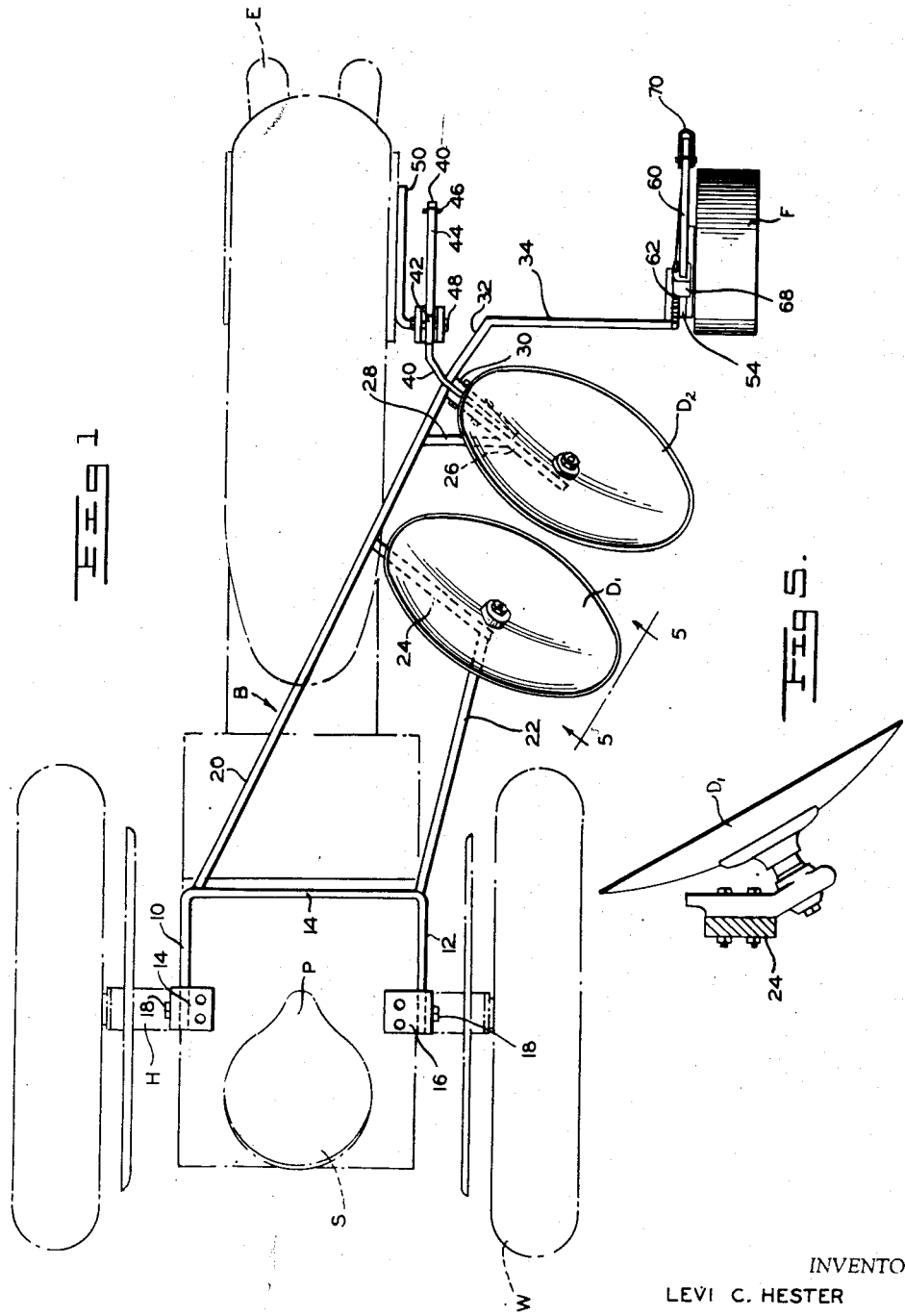
INVENTOR
LEVI C. HESTER
BY Cushman, Darby & Cushman
ATTORNEY

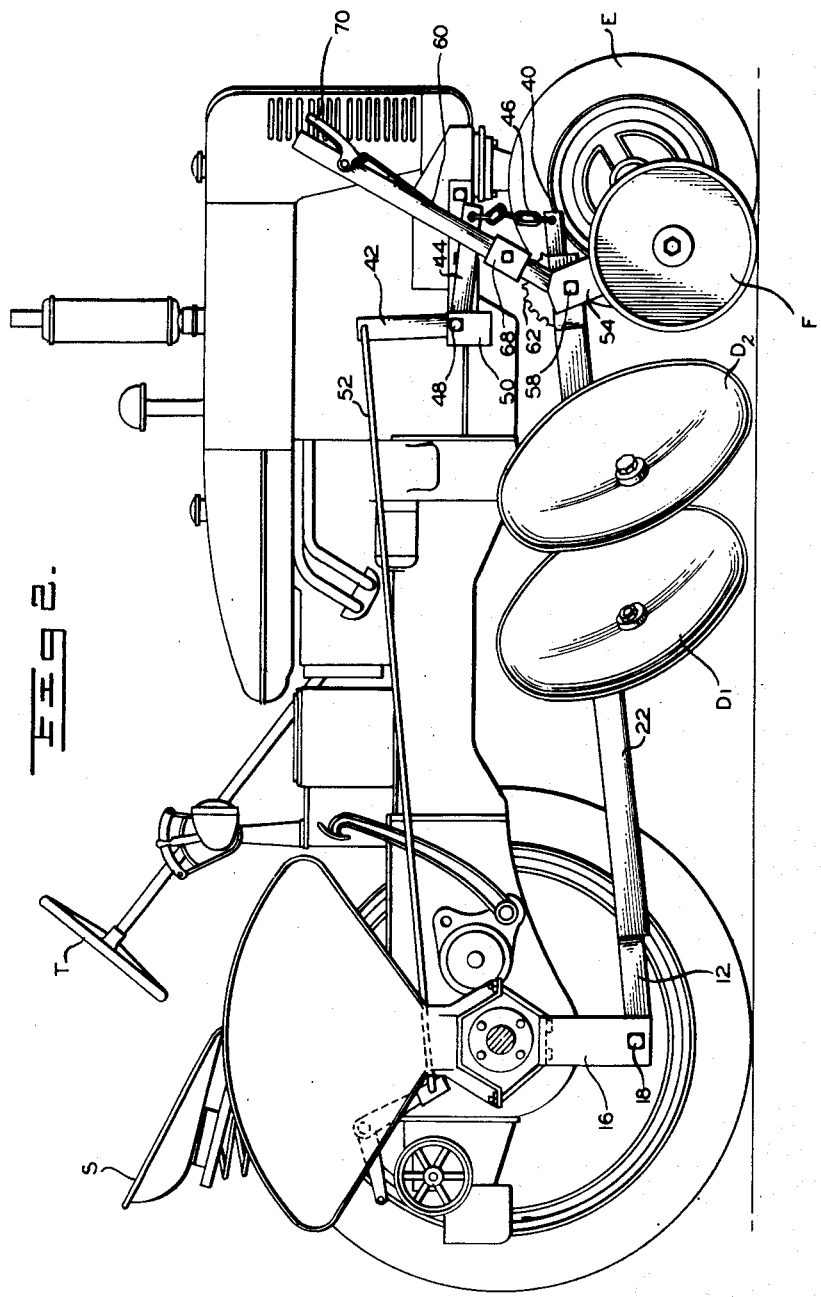

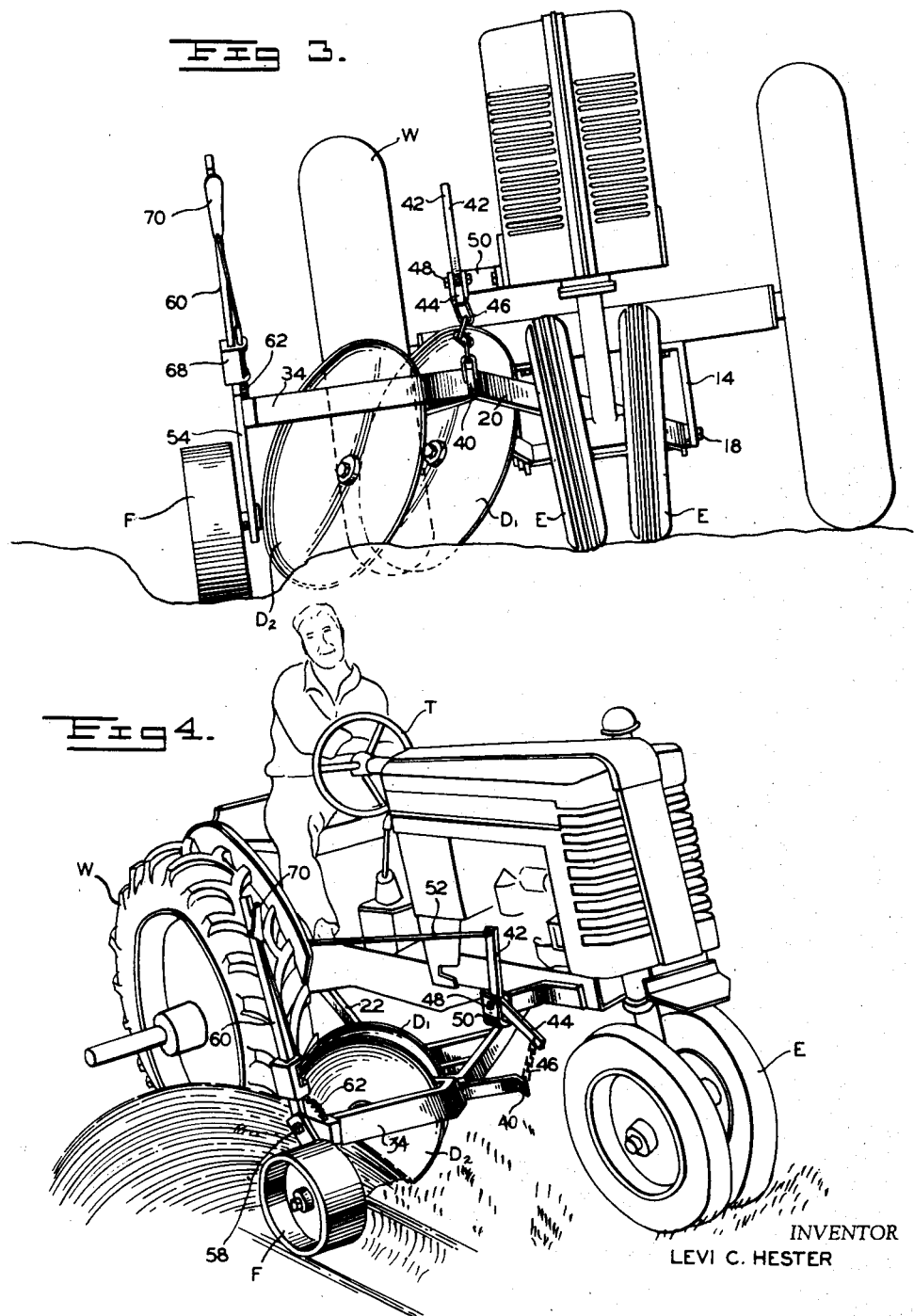

Patented Feb. 17, 1953

2,628,547

UNITED STATES PATENT OFFICE 2,628,547

TRACTOR MOUNTED DISK PLOW

Levi C. Hester, Jacksonville, Fla.; Eythel J. Richardson, executrix of said Levi C. Hester, deceased, assignor to Hester Plow Co., Inc., Jacksonville, Fla., a corporation of Florida Application November 22, 1949, Serial No. 128,794

3 Claims. (Cl. 97—47)

1

The present invention relates to a side plow for tractors. The principal object of the invention is to provide such a side plow having means for effectively and evenly applying a forwardly directed plowing pressure to the plowing discs, and having means for effectively controlling the application of the plowing force, all in such manner that the plowing action is under the close observation of the operator of the tractor.

A particular object of the invention is to provide a plow as referred to above having means for effectively and continuously controlling the depth of penetration of the plowing discs, by reference to the depth of the furrow previously plowed. Ancillary to the object just stated, it is a purpose of the invention to provide a side plow construction wherein the depth of penetration may be adjusted with respect to the depth of the furrow previously cut.

By reference to the drawings and the following description, it will be observed that I have devised a novel side plow construction comprising a forked side beam which extends forwardly and outwardly from spaced points on opposite sides of the center line of the tractor adjacent the rear end thereof, the forward end of this beam being free to move upwardly and downwardly around the rear pivot points adjacent the rear axle of the tractor. On the forward end of the beam, there is a rigidly mounted furrow wheel which is displaced laterally and outwardly from the plowing discs carried by the beam, by the distance desired between the furrows being plowed. Means are provided for yieldably securing the forward end of the beam to the tractor frame permitting free floating or vertical movement of the beam within certain limits. The parts are arranged, including the size and design of such parts as the furrow wheel, so that the latter rolls continuously in the last furrow during the plowing operation with the front end of the beam floating between these limits and thus establishing a mean plane of penetration of the plowing discs, irrespective of humps and gullies encountered by the front wheels of the tractor, which plane is related to the depth of the cut of the previous furrow.

The construction is such that the depth of the plowing may be adjusted as desired, and refinements in the control of the plowing action are possible because of the structure referred to as well as the mounting of the parts immediately in front of and below the operator so that the plowing action is under close observation at all times.

2

Referring to the drawings which disclose one design of side plow constructed in accordance with the invention (it being understood that the precise construction of the equipment will vary depending on the type of tractor to which the side plow is attached):

Figure 1 is a top plan view of a tractor with the plow attached thereto;

Figure 2 is a side elevational view of the plow shown in Figure 1, this view showing the arrangement of the parts rather than being intended to represent their exact relative relationship during the plowing action;

Figure 3 is a front elevational view of the tractor with the plow attached thereto, and illustrating the relationship of the parts during plowing;

Figure 4 is a view of the tractor as it would appear from a point forwardly and outwardly from the tractor on the plowing side, which illustrates the relative arrangement of the parts during the plowing action; and Figure 5 is a detail view showing the manner in which the plowing discs are carried on journals which are in turn mounted on brackets depending from the beam, the journals being located in planes displaced below the beam, all in a manner now well known in the art.

Referring to Figure 1, the tractor is shown having rear side traction wheels W which are mounted on the conventional rear axle supported in the rear axle housing H. It will be understood that the rear axle assembly will have the usual differential drive, and that the power to drive the tractor will be received from the engine located beneath the tractor hood. The tractor chassis is shown supported at its forward end by the central closely spaced steering wheels E, the latter being under the control of the operator's steering control wheel T, but the use of a single central front wheel is contemplated. The operator's seat is at S, and it will be noted that he is positioned directly above a point P where the longitudinal center line of the tractor intersects the rear axle of the tractor.

The operating parts of this side plow attachment, as is apparent from Figure 1, are closely mounted in near the longitudinal center line of the tractor and generally within that forward right hand quadrant, with reference to the operator, between the rear furrow side traction wheel W and the steering wheels E of the tractor.

The plowing equipment itself comprises a beam B carrying plowing discs $D_1$ and $D_2$ and a control mechanism comprising a forwardly mounted furrow wheel F. The furrow wheel is mounted for turning movement on an axle which is parallel to that of the wheels W.

The beam comprises a forked rear portion comprising a bracket having opposite legs 10 and 12 secured together by a cross bar 14. The legs 10 and 12 are equipped in any suitable manner to be pivotally attached on brackets 14 and 16 which are in turn rigidly attached to and in depending relationship from the rear axle housing. The said pivotal attachment may be accomplished such as by means of pivot pins 18.

It will be understood that the manner and position of this pivotal attachment may vary in accordance with the type of tractor to which the plowing equipment is attached. Tractors now available to the public differ widely from one another, and their designs are frequently changed. Consequently, it would be necessary for side plowing equipment which is to be attached to such tractors to likewise vary in constructional features so as to be adaptable to the various designs of tractors, and it will be understood that it is not intended to limit this invention to use on any particular tractor.

The tractor beam has forwardly and outwardly extending oppositely disposed arms 20 and 22, and toward the forward end of the beam, these arms are connected by a rearwardly inclined disc box hanger 24. Forwardly and outwardly of the brace 24, the beam has another disc box hanger 26 which is generally parallel to the arm 24 and it may be supported for strength by a corner brace 28 as shown. Integral with or rigidly attached to the forward end of the arm 26, as by bolts, is a unitary bracket comprising an arm 30 and a short continuation at 32 of the arm 20 which is bent outwardly laterally of the tractor providing a supporting member 34 for the furrow wheel F. The plowing discs $D_1$ and $D_2$ are mounted in the conventional manner on the members 24 and 26.

Referring to Figure 2, it will be noted that the supporting member 34 is so arranged on the beam B that the furrow wheel F is disposed slightly in the rear of the front wheels E of the tractor. In order to attach the forward end of the beam to the tractor frame and to permit free movement of the beam within maximum limits, the beam is designed so that its arm 20 has a forwardly extending end 40, and this end is flexibly connected to the end of a bell crank lever having upper and lower arms 42 and 44 respectively, by a loosely arranged chain 46. The bell crank lever is pivotally carried as at 48 on any suitable bracket 50 rigid with the frame of the tractor. In order to operate the bell crank lever comprising the arms 42, 44, there is a rigid connecting rod 52 extending rearwardly from the end of the upper lever 42 and being connected at its rear end to any suitable lever or shaft mechanism commonly found on the tractor, so that the operator may pull the connecting rod rearwardly to elevate the forward end of the beam when plowing is discontinued, or to move the connecting rod 52 forwardly until the furrow wheel F assumes control to govern the operation and penetration of the plowing discs $D_1$ and $D_2$, as hereinafter described.

Referring to Figure 3, the furrow wheel F is mounted for rotation on the lower end of a foot-piece 54, the latter being adjustably mounted on the end of the member 34 (which constitutes the forward part of the beam) around a pivot point 58. Any suitable mechanical arrangement may be provided to accomplish this vertical adjustment of the furrow wheel F on the beam. For example, I have illustrated the use of an adjusting arm 60 which is disposed at an angle to the foot-piece 54, but is rigid therewith in its movement around the pivot 58. A segmental gear 62 may be rigidly mounted on the end of the member 34, and the adjusting arm may carry suitable ratchet teeth within its housing 68 operated by a hand lever 70 in a manner well known in the art, to permit adjustable movement of the adjusting arm 60 around the pivot point 58, and the retaining of the arm and consequently of the foot-piece 54, in the desired adjusted position.

It will be evident from the disclosure of Figure 2 that the movements of arm 60 and foot-piece 54 will move the center of rotation of the furrow wheel F upwardly and downwardly with respect to the plowing discs $D_1$ and $D_2$, thus to adjust the depth of penetration of the latter relative to the bottom or depth of the furrow last plowed. For example, if the adjusting arm 60 is moved forwardly, as viewed in Figure 2, the displacement of the center of rotation of the furrow wheel F from the pivot point 58 in a vertical direction is increased. Consequently, the discs $D_1$ and $D_2$ would only be required to cut a relatively shallow furrow under the control of the furrow wheel F riding freely along and supporting the weight of the plowing assembly on the bottom of the furrow previously plowed. However, when the adjusting arm 60 is moved rearwardly throwing the foot lever 54 forwardly, the vertical displacement of the center of rotation of the furrow wheel F below the pivot point 58 is reduced, and consequently, the plowing discs $D_1$ and $D_2$ are required to cut a deeper furrow, with relation to the depth of the preceding furrow in which the wheel F is supported.

Referring particularly to Figures 3 and 4, it will be noted that during operation of this plow, the chain 46 does not suspend the forward end of the beam. In fact, the connecting rod 52 is always moved far enough forwardly when plowing is commenced so that the forward support for the beam and the connected parts is solely supplied by the furrow wheel F. As the plowing operation proceeds, the furrow wheel F remains in sole control of the depth of penetration of the plowing discs $D_1$ and $D_2$. It will be noted in Figure 1 that this furrow wheel has a broad and flat periphery, so that it will not penetrate the soil. This wheel is also strongly built and of substantial weight in order to meet the rugged work which it is called on to perform. Referring to Figure 2, it will be understood that during plowing, the front wheels E of the tractor may encounter a hump or obstacle in the ground. Sudden elevation of these wheels caused by an obstruction will not effect the plowing discs, for the chain 46 is maintained in quite loose condition at all times, and therefore the plowing discs are held to their work and at properly related depth by the furrow wheel F. Similarly, if the front wheels E should drop into a gully in the ground, the loose connection referred to permits downward movement of the tractor frame without effecting the discs $D_1$ and $D_2$.

The pronounced effectiveness of the plow as described is due to the close in arrangement of the parts as may best be appreciated from Figures 1 and 4. Referring to Figure 1, it will be noted that the pivot connections for the rear end of the beam are adjacent to and beneath the rear axle and on opposite sides of the longitudinal center line of the tractor. The plowing discs are disposed immediately in front of the rear traction wheel on the plowing side so that they make a furrow for that wheel, as is apparent from Figure 4. The furrow wheel F is disposed in a position angularly forward of the plowing discs, but not forwardly beyond the front wheel of the tractor, and the furrow wheel is positioned outwardly beyond the discs and beyond the rear traction wheel so that it runs in the previously cut furrow.

The plowing discs are positioned to receive positive and direct application of force from the rear axle of the tractor to force their cutting action, yet the force applied is closely and directly controlled by the furrow wheel which also responds to these forces and limits their action on the plowing discs with relation to the depth of the previously cut furrow, by the rolling engagement of this furrow wheel along the bottom of the previous furrow. In plowing, the general reaction on the beam is downwardly around its pivot point to effect the plowing action as controlled by the furrow wheel F.

Referring to Figures 3 and 4, it will be noted that the plow is canted slightly toward the plowing side, for the rear traction wheel is running in the furrow just cut by the plowing discs while the opposite traction wheel is rolling on unplowed ground.

In this view, it will be observed that the connecting rod 52 is moved well forwardly and that the arm 44 of the bell crank lever is down to an extent sufficient to give complete control of the movements of the beam, and consequently of the plowing discs, to the furrow wheel F. The parts are so arranged that the depth of the cut is regulated by the displacement of the furrow wheel F from the plowing discs. The furrow wheel F is mounted on the forward end of the beam in such manner as to preclude any pivotal movement of the wheel with respect to the beam, and the operator steers the tractor to maintain the furrow wheel riding along in the previously cut furrow, thus securing a uniform and even action of the plowing discs.

As viewed in Figure 4, it will be observed that the furrow wheel and the plowing discs are in a substantially direct line from the intersection of the rear axle of the tractor and the longitudinal center thereof at a point beneath the driver's seat. This relationship may be observed in Figure 1, wherein a base line drawn from point P outwardly through the plowing discs and through the furrow wheel makes an acute angle with the longitudinal center line of the tractor.

I claim:

1. A side plow for a tricycle-type tractor comprising a beam having a forked rearward portion with means for pivoting it to the tractor frame at spaced points adjacent the rear axle of the tractor and on opposite sides of the longitudinal center line of the tractor, said beam being formed to extend forwardly and outwardly along the side of the tractor at an acute angle to said center line and having a plowing disc mounted on its forward portion at a point such as to position said disc rearwardly of the front wheel of the tractor, said beam being so formed and of such length as to terminate at its forward end at a point spaced laterally outwardly from said plowing disc a distance equal to that between contiguous furrows to be plowed, a furrow wheel rigidly mounted but for vertical adjustment on the forward end of said beam and having its axis of rotation rearwardly of the axis of rotation of the front wheel, said wheel having a ground contacting surface to roll in the furrow previously plowed and formed to prevent soil penetration, and means for loosely attaching said beam adjacent its forward end to the frame of the tractor to provide for free up and down movement of the forward end of the tractor relative to said furrow wheel and the forward end of said beam during plowing.

2. A construction in accordance with claim 1 wherein said plowing disc and said furrow wheel are positioned in substantially the same vertical plane passing forwardly and outwardly through a point adjacent the center of the rear axle of the tractor and at an acute angle to the vertical longitudinal center line plane of the tractor.

3. A construction in accordance with claim 1 wherein said plowing disc and said furrow wheel are positioned in substantially the same vertical plane passing forwardly and outwardly through a point adjacent the center of the rear axle of the tractor and at an angle of approximately thirty degrees to the vertical longitudinal center line plane of the tractor.

LEVI C. HESTER.

REFERENCES CITED

The following references are of record in the file of this patent:

UNITED STATES PATENTS

| Number | Name | Date |
|---|---|---|
| 1,361,638 | Stephenson | Dec. 7, 1920 |
| 2,041,832 | Hester | May 26, 1936 |
| 2,132,166 | Hester | Oct. 4, 1938 |
| 2,339,225 | Strandlund | Jan. 11, 1944 |
| 2,424,372 | Silver | July 22, 1947 |